United States Patent
Thangarasa et al.

(10) Patent No.: US 11,937,109 B2
(45) Date of Patent: Mar. 19, 2024

(54) GAP SHARING UNDER COVERAGE ENHANCEMENT

(71) Applicant: Telefonaktiebolaget LM Ericsson (PUBL), Stockholm (SE)

(72) Inventors: Santhan Thangarasa, Vällingby (SE); Muhammad Kazmi, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/550,633

(22) Filed: Dec. 14, 2021

(65) Prior Publication Data

US 2022/0104046 A1 Mar. 31, 2022

Related U.S. Application Data

(63) Continuation of application No. 16/500,537, filed as application No. PCT/IB2018/052270 on Apr. 2, 2018, now Pat. No. 11,218,893.

(60) Provisional application No. 62/480,993, filed on Apr. 3, 2017.

(51) Int. Cl.
  *H04W 24/08* (2009.01)
  *H04W 24/02* (2009.01)
  *H04W 74/08* (2009.01)

(52) U.S. Cl.
  CPC .......... *H04W 24/08* (2013.01); *H04W 24/02* (2013.01); *H04W 74/0833* (2013.01)

(58) Field of Classification Search
  CPC . H04W 24/08; H04W 24/02; H04W 74/0833; H04W 36/0088
  See application file for complete search history.

(56) References Cited

U.S. PATENT DOCUMENTS

| 2016/0198385 A1* | 7/2016 | Braun ............... H04W 36/0094 455/437 |
| 2017/0026863 A1 | 1/2017 | Wang et al. |
| 2018/0279312 A1* | 9/2018 | Dalsgaard ............. H04W 24/10 |

FOREIGN PATENT DOCUMENTS

| CN | 103262609 A | 8/2013 |
| CN | 104348580 A | 2/2015 |
| WO | 2019094977 A1 | 5/2019 |

OTHER PUBLICATIONS

European Patent Office, Communication pursuant to Article 94(3) EPC, Application No. 18723958. 7, dated May 25, 2021, 7 pages.
Indian Office Action for Patent Application No. 201917041491 dated Jan. 27, 2021.

(Continued)

*Primary Examiner* — Ayanah S George
(74) *Attorney, Agent, or Firm* — BAKER BOTTS L.L.P.

(57) ABSTRACT

According to certain embodiments, a method for use in a wireless device comprise determining a coverage level with respect to a serving cell, selecting one of a plurality of configurations for sharing gaps between intra- and inter-frequency measurements, and performing one or more measurements according to the selected configuration for sharing gaps. The configuration for sharing gaps is selected based at least in part on the determined coverage level. For example, certain embodiments use the determined coverage level to select one of a plurality of tables, wherein each table comprises one or more schemes that indicate how to share gaps between intra- and inter-frequency measurements.

26 Claims, 7 Drawing Sheets

(56) References Cited

OTHER PUBLICATIONS

3GPP TSG-RAN WG4 Meeting #82bis, R4-1703718, Change Request: "CR on measurement gap sharing for feMTC"; Intra- and inter frequency measurement; Spokane, Washington USA Apr. 3-7, 2017; 4 pages.
3GPP TSG RAN WG2 Meeting #97bis, R2-1702968, Change Request: Measurement gap sharing for FeMTC intra- and inter frequency measurement; Spokane, Washington USA Apr. 3-7, 2017; 4 pages.
3GPP TS 36.133 V14.3.0; Mar. 2017; 257 pages.
Chinese Office Action issued for Patent Application No. 201880036901.2—dated Jun. 17, 2022.
Chinese Search Report issued for Patent Application No. 2018800369012—dated Jun. 13, 2022.

* cited by examiner

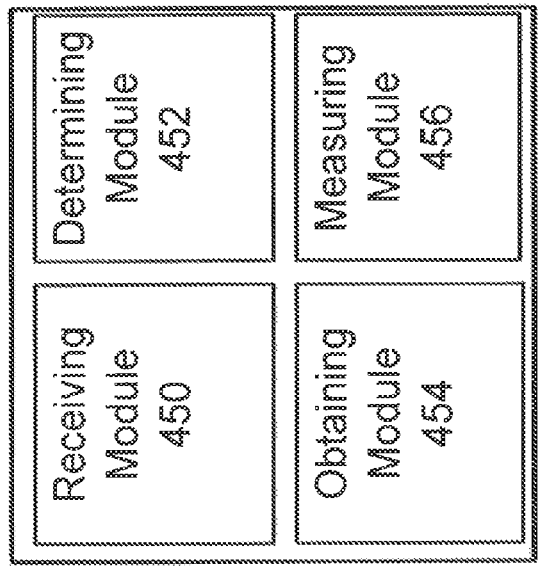
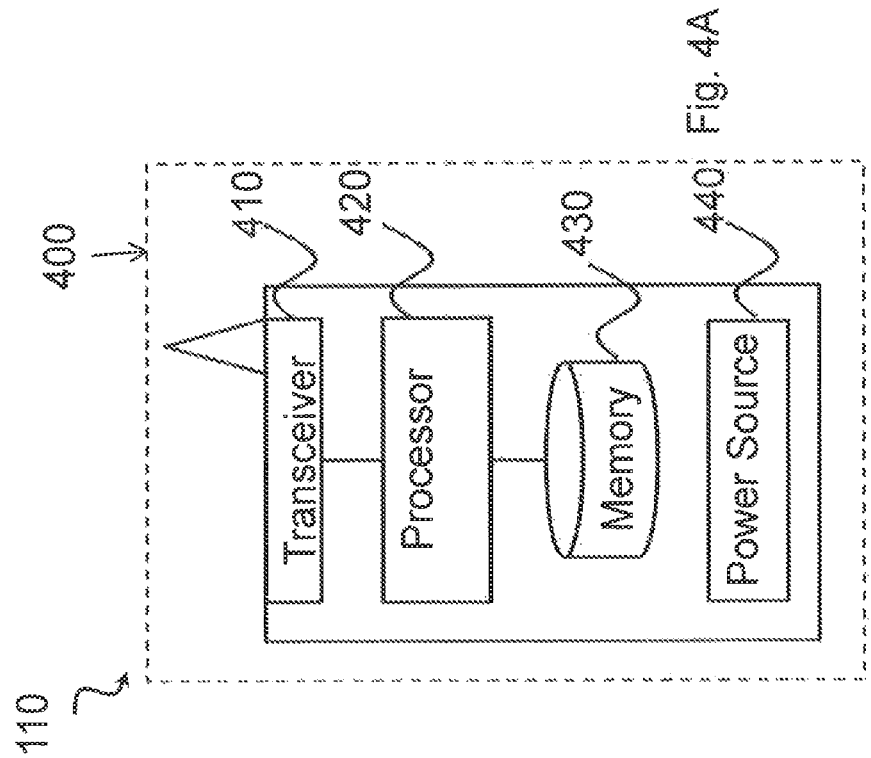

GAP SHARING UNDER COVERAGE ENHANCEMENT

PRIORITY

This application is a continuation, under 35 U.S.C. § 120, of U.S. patent application Ser. No. 16/500,537 filed on Oct. 3, 2019, which is a U.S. National Stage Filing under 35 U.S.C. § 371 of International Patent Application Serial No. PCT/IB2018/052270 filed Apr. 2, 2018 and entitled "GAP SHARING UNDER COVERAGE ENHANCEMENT" which claims priority to U.S. Provisional Patent Application No. 62/480,993 filed Apr. 3, 2017 each of which is hereby incorporated by reference in their entirety.

TECHNICAL FIELD

Particular embodiments are directed to wireless communications and, more particularly, to controlling gap sharing under coverage enhancement for machine-type communication (MTC).

BACKGROUND

Machine-Type Communication (MTC) is a form of data communication involving one or more entities that do not necessarily need human interaction. MTC is an important and growing revenue stream for wireless network operators. MTC devices, such as monitors, sensors, controls, etc., may also be referred to as MTC user equipment (UE). Operators benefit from serving MTC devices with already deployed radio access technology (RAT). For example, Long Term Evolution (LTE) is a competitive radio access technology for efficient support of MTC.

MTC devices may generally be of low cost and low complexity. A low complexity UE for machine-to-machine (M2M) operation may implement one or more low cost features such as smaller downlink and uplink maximum transport block size (e.g., 1000 bits) and/or reduced downlink channel bandwidth of 1.4 MHz for data channel (e.g., physical downlink shared channel, PDSCH).

A low cost UE may comprise a half-duplex frequency division duplex (HD-FDD) and one or more of the following additional features: single receiver (1 Rx) at the UE, smaller downlink and/or uplink maximum transport block size (e.g., 1000 bits), and/or reduced downlink channel bandwidth of 1.4 MHz for data channel. The low cost UE may also be referred to as a low complexity UE.

The path loss between an M2M device and the base station can be very large in some scenarios, such as when the M2M device is used as a sensor or metering device located in a remote location, such as in a basement of a building. In such scenarios, the reception of a signal from the base station is very challenging. For example, the path loss can be 20 dB worse than normal cellular network operation. To cope with such challenges, the coverage in uplink and/or in downlink has to be substantially enhanced. This is realized by employing one or more advanced techniques in the UE and/or in the radio network node for enhancing the coverage.

Some examples of such advanced techniques include, but are not limited to, transmit power boosting, repetition of transmitted signal, applying additional redundancy to the transmitted signal, use of advanced/enhanced receiver, etc. In general, when employing such coverage enhancing techniques, the M2M may be referred to as operating in "coverage enhancing mode."

A low complexity MTC UE (e.g., UE with 1 Rx and/or limited bandwidth) may support enhanced coverage mode of operation (i.e., coverage enhanced mode B (CEModeB)). The normal coverage mode of operation may be referred to as coverage enhanced mode A (CEModeA).

The coverage enhancement level may be configurable. The enhanced MTC (eMTC) or further enhanced MTC (FeMTC) UE may be configured via radio resource control (RRC) with one of the two possible coverage modes (i.e., CEModeA or CEModeB). These are also sometimes referred to as coverage enhancement levels. The CEModeA and CEModeB are associated with different number of repetitions used in downlink and/or uplink physical channels (e.g., PDSCH and/or physical uplink shared channel (PUSCH)) as signaled in the following RRC message in Third Generation Partnership Project (3GPP) TS 36.331 v13.3.2.

```
PDSCH-ConfigCommon-v1310 ::=    SEQUENCE {
    pdsch-maxNumRepetitionCEmodeA-r13     ENUMERATED {
                                            r16, r32 }        OPTIONAL,  -- Need OR
    pdsch-maxNumRepetitionCEmodeB-r13     ENUMERATED {
                                            r192, r256, r384, r512, r768, r1024,
                                            r1536, r2048}     OPTIONAL   --
Need OR
}
pdsch-maxNumRepetitionCEmodeA indicates the set of PDSCH repetition numbers for CE mode A
pdsch-maxNumRepetitionCEmodeB indicates the set of PDSCH repetition numbers for CE mode B.
PUSCH-ConfigCommon-v1310 ::=    SEQUENCE {
    pusch-maxNumRepetitionCEmodeA-r13     ENUMERATED {
                                            r8, r16, r32 }    OPTIONAL,  --
Need OR
    pusch-maxNumRepetitionCEmodeB-r13     ENUMERATED {
                                            r192, r256, r384, r512, r768, r1024,
                                            r1536, r2048}     OPTIONAL,  --
Need OR
pusch-maxNumRepetitionCEmodeA indicates the set of PUSCH repetition numbers for CE mode A.
pusch-maxNumRepetitionCEmodeB indicates the set of PUSCH repetition numbers for CE mode B.
```

However, if the UE is not configured in any of CEModeA and CEModeB, then according to TS 36.211 v13.2.0, the UE shall assume the following CE level configuration: if the physical random access channel (PRACH) coverage enhancement (CE) level is 0 or 1, then the UE shall assume CEModeA; or if the PRACH CE level is 2 or 3, then the UE shall assume CEModeB.

The UE determines one of 4 possible CE levels (0, 1, 2, and 3) during the random access procedure by comparing the downlink radio measurement (e.g., reference signal received power, RSRP) with the one or more thresholds signaled to the UE by the network node.

MTC devices may use measurement gaps. 3GPP LTE has specified two measurement gap patterns since Rel-8 (36.133), as shown below in Table 1. However, more measurement patterns (e.g., with a shorter length) are being specified within the enhanced measurement gaps work item in 3GPP.

TABLE 1

Gap Pattern Configurations supported by the UE

| Gap Pattern Id | Measurement Gap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1× |
| 1 | 6 | 80 | 30 | Inter-Frequency E-UTRAN FDD and TDD, UTRAN FDD, GERAN, LCR TDD, HRPD, CDMA2000 1× |

Traditionally, such measurement gaps have been used for inter-frequency and inter-radio access technology (inter-RAT) measurements. In FeMTC, the existing measurement gaps are shared between intra-frequency and inter-frequency measurements because bandwidth-limited UEs need to retune to the central physical resource blocks (PRBs) to receive the primary synchronization signal (PSS)/secondary synchronization signal (SSS), while the UEs may be configured to receive data in other parts of the system bandwidth.

The gap sharing between intra- and inter-frequency can be controlled by the network. More specifically, the network can configure the percentage of gaps (denoted as X) assumed for intra-frequency measurements, and the remaining percentage of gaps (1–X) are assumed for inter-frequency measurements. For example, a network may have four values (e.g., 50%, 60%, 70%, and 80%) for X (which means 2 bits are needed for signaling). The particular values for X may be defined in TS 36.133.

SUMMARY

Previous techniques for gap sharing may have certain problems. For example, a particular problem in FeMTC is that the existing measurement gaps are shared between intra-frequency and inter-frequency measurements because a UE needs to retune to the central PRBs to read PSS/SSS and to perform the RSRP/reference signal received quality (RSRQ) measurements. Related to the coverage enhancement is support for multiple enhancement levels. FeMTC supports operation under different coverage enhancement levels (e.g., CEModeA/normal coverage and CEModeB/enhanced coverage). Typically, the measurement requirements under enhanced coverage are more relaxed (i.e., they take longer time) compared to the normal coverage because a UE needs to collect more samples or receive more repetitions to be able to successfully measure/decode under low signal-to-noise ratio (SNR) (Es/Iot) levels. The measurement gaps occur periodically (e.g., every 40 ms or every 80 ms depending on the configuration). In enhanced coverage, the measurement time is substantially longer than in normal coverage. This means under gap sharing between intra-frequency and inter-frequency measurements, the measurement time under enhanced coverage will become even longer. This will severely degrade mobility performance which relies on the measurements. Certain embodiments of the present disclosure may provide solutions to these or other problems.

Certain embodiments described herein include a user equipment (UE) measurement procedure for a UE whose radio frequency bandwidth is less than a serving cell bandwidth by a particular margin (by at least X MHz, e.g., UE bandwidth=1.4 MHz, serving cell BW=5 MHz). The UE uses gaps for performing measurements on a serving carrier. The gaps may be shared between measurements on serving and non-serving carriers.

According to some embodiments, the UE adapts a percentage of measurement gaps used for performing measurements on one or more carriers based on the UE coverage enhancement level (e.g., normal or enhanced coverage level) with respect to a cell (e.g., with respect to the serving cell). For example, the UE in normal coverage with respect to the serving cell uses smaller percentage (e.g., X=60%) of measurement gaps for performing measurements on carrier(s) compared to the scenario when the UE is in enhanced coverage with respect to serving cell.

The method in a wireless device may be summarized in the following steps: (a) determining a relation between a UE radio frequency bandwidth and a serving cell bandwidth; (b) receiving a request to measure on non-serving carriers (e.g., inter-frequency carriers and inter-RAT carriers); (c) determining a coverage level of the UE; (d) obtaining information about measurement gap information based on determined coverage level; (e) performing, based on the obtained measurement gap information, measurements on non-serving carriers; (f) sending the result of the performed measurement to another node; and (g) using the result of the performed measurement for one or more operational tasks.

According to certain embodiments, a method for use in a wireless device comprises selecting one of a plurality of configurations for sharing gaps between intra- and inter-frequency measurements and performing one or more measurements according to the selected configuration for sharing gaps. The configuration for sharing gaps is selected based at least in part on a determined coverage level.

Certain embodiments may include one or more additional features, examples of which follow:

In some embodiments, the configuration for sharing gaps allocates a pre-defined percentage of gaps (X) for infra-frequency measurements and a remaining percentage of gaps (100–X) for inter-frequency measurements. For example, in some embodiments, selecting the configuration for sharing gaps comprises selecting a first configuration for sharing gaps in response to determining that the coverage level corresponds to a first coverage level and selecting a second configuration for sharing gaps in response to determining that the coverage level corresponds to a second coverage level. The second coverage level is associated with worse coverage than the first coverage level, and the second configuration for sharing gaps allocates a higher percentage of gaps for intra-frequency measurements than the first configuration for sharing gaps.

In some embodiments, selecting the configuration for sharing gaps comprises using the determined coverage level to select one of a plurality of tables. Each table comprises one or more schemes that indicate how to share gaps between intra- and inter-frequency measurements. For example, in some embodiments, the one or more schemes associated with a table that corresponds to a low coverage level allocate a higher percentage of gaps for intra-frequency measurements than the respective one or more schemes associated with a table that corresponds to a normal coverage level. In some embodiments, the normal coverage level comprises a signal-to-noise ratio (SNR)$\geq -6$ dB at the wireless device with respect to a signal received from the serving cell, and the low coverage level comprises an SNR $-15$ dB$\leq$SNR$<-6$ dB at the wireless device with respect to the signal received from the serving cell. In some embodiments, the normal coverage level comprises SCH Ês/Iot$\geq -6$ dB and CRS Ês/Iot$\geq -6$, and the low coverage level comprises SCH Ês/Iot$\geq -15$ dB and CRS Ês/Iot$\geq -15$.

In some embodiments, the method further comprises determining the coverage level with respect to the serving cell prior to selecting the configuration for sharing gaps. In some embodiments, the coverage level is based at least in part on a signal quality and/or a signal strength of a signal that the wireless device receives from the serving cell. In some embodiments, the coverage level is based at least in part on a signal quality and/or a signal strength of a signal that the serving cell receives from the wireless device. In some embodiments, the coverage level is based at least in part on a number of repetitions used by the wireless device during a random access procedure. In some embodiments, the coverage level is determined from a plurality of coverage levels, the plurality of coverage levels comprising at least a first coverage level and a second coverage level. For example, the first coverage level corresponds to coverage enhanced mode A (CEModeA) and the second coverage level corresponds to coverage enhanced mode B (CEModeB).

In some embodiments, selecting the configuration for sharing gaps comprises using the determined coverage level to select a portion of a table that is associated with the determined coverage level. Each portion of the table comprises one or more schemes that indicate how to share gaps between intra- and inter-frequency measurements.

In some embodiments, selecting the configuration for sharing gaps is performed at least in part in response to determining that a radio frequency bandwidth of the wireless device is less than a radio frequency bandwidth of the serving cell by at least a pre-determined margin.

In some embodiments, the method further comprises sending a result of the one or more measurements to the serving cell node or another node and/or using a result of the one or more measurements for an operational task.

In some embodiments, the inter-frequency measurements comprise intra-RAT measurements. In some embodiments, the inter-frequency measurements comprise inter-RAT measurements.

According to certain embodiments, a wireless device comprises processing circuitry operable to perform any of the above-described methods.

According to certain embodiments, a non-transitory computer readable medium comprises logic that, when executed by processing circuitry of a wireless device, causes the wireless device to perform any of the above-described methods.

According to certain embodiments, a method for use in a network node comprises selecting one of a plurality of configurations for use by a wireless device for sharing gaps between intra- and inter-frequency measurements. The selecting is based at least in part on a determined coverage level of a wireless device. The method further comprises transmitting the selected configuration for sharing gaps to the wireless device.

According to certain embodiments, a computer readable medium comprises logic that, when executed by processing circuitry of a network node, causes the network node to perform the above-described method.

According to certain embodiments, a network node comprises processing circuitry operable to select one of a plurality of configurations for use by a wireless device for sharing gaps between intra- and inter-frequency measurements. The network node selects the configuration for sharing gaps based at least in part on a determined coverage level of the wireless device. The network node is operable to transmit the selected configuration for sharing gaps to the wireless device.

Particular embodiments may exhibit some of the following technical advantages. Particular embodiments facilitate UEs in different coverage levels to perform measurement on non-serving carriers that require gaps and meet the corresponding requirements. The measurement gaps may be used more efficiently. Overall UE measurement performance may be enhanced, which in turn enhances the mobility performance. For example, even in enhanced coverage the measurement time of cells on a carrier remains within an acceptable limit. Other technical advantages will be readily apparent to one skilled in the art from the following figures, description and example claims.

BRIEF DESCRIPTION OF THE DRAWINGS

For a more complete understanding of the embodiments and their features and advantages, reference is now made to the following description, taken in conjunction with the accompanying drawings, in which:

FIG. 4A is a block diagram illustrating an example embodiment of a wireless device;

FIG. 4B is a block diagram illustrating example components of a wireless device;

DETAILED DESCRIPTION

Figure 1:
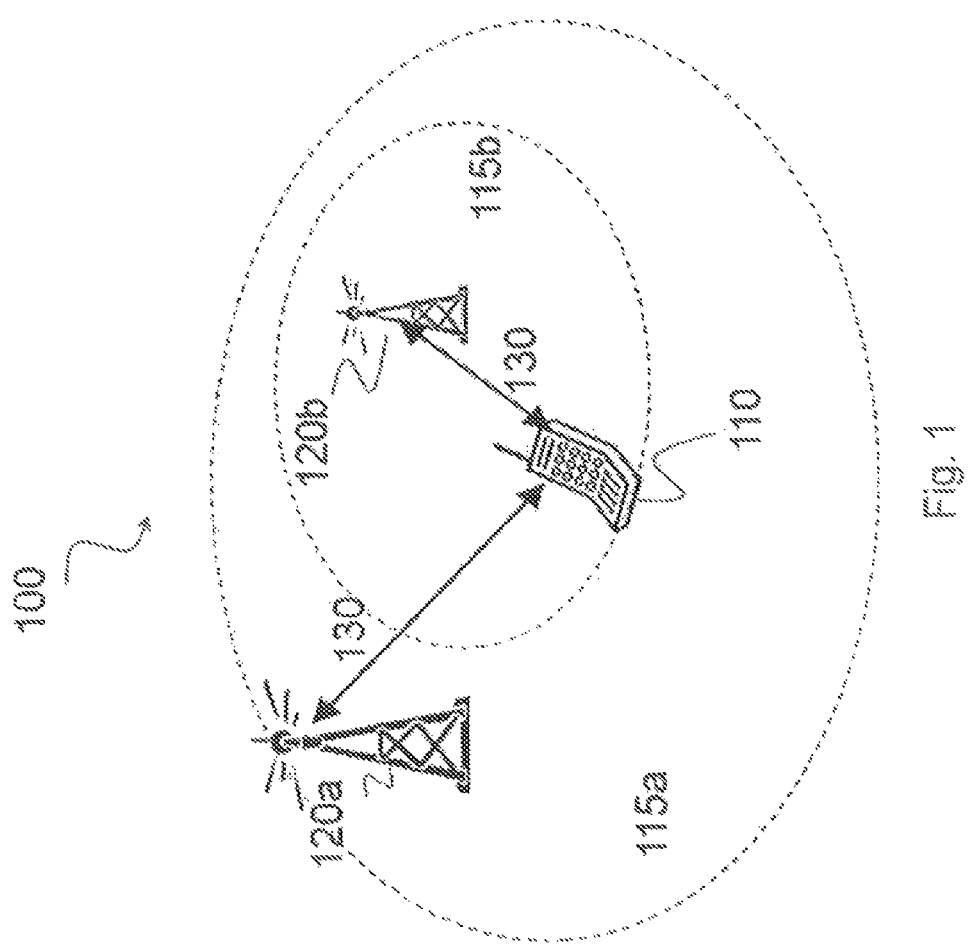
FIG. 1 is a block diagram illustrating an example wireless network, according to some embodiments.

Machine-Type Communication (MTC) is a form of data communication involving one or more entities that do not necessarily need human interaction. MTC devices, such as monitors, sensors, controls, etc., may also be referred to as MTC user equipment (UE).

MTC devices may generally be of low cost and low complexity. A low complexity UE for machine-to-machine (M2M) operation may implement one or more low cost features such as smaller downlink and uplink maximum transport block size (e.g., 1000 bits) and/or reduced downlink channel bandwidth of 1.4 MHz for data channel (e.g., PDSCH).

The path loss between M2M device and the base station can be very large in some scenarios, such as when used as a sensor or metering device located in a remote location such as in a basement of a building. In such scenarios the reception of signal from base station may be challenging. To cope with such challenges, the coverage in uplink and/or in downlink has to be substantially enhanced.

Some non-limiting examples of coverage enhancement techniques include transmit power boosting, repetition of transmitted signal, applying additional redundancy to the transmitted signal, use of advanced/enhanced receiver, etc. A low complexity MTC UE (e.g., UE with 1 Rx and/or limited bandwidth) may support enhanced coverage mode of operation (i.e., coverage enhanced mode B (CEModeB)). The normal coverage mode of operation may be referred to as coverage enhanced mode A (CEModeA).

MTC devices may use measurement gaps. Traditionally, measurement gaps have been used for inter-frequency and inter-RAT measurements. In FeMTC, the existing measurement gaps are shared between intra-frequency and inter-frequency measurements because bandwidth-limited UEs need to retune to the central PRBs to receive PSS/SSS, while it may be configured to receive data in other parts of the system bandwidth.

The gap sharing between intra- and inter-frequency can be controlled by the network. More specifically, the network can configure the percentage of gaps (denoted as X) assumed for intra-frequency measurements, and the remaining percentage of gaps (1−X) are assumed for inter-frequency measurements.

A particular problem is that in FeMTC the existing measurement gaps are shared between intra-frequency and inter-frequency measurements because a UE needs to retune to the central PRBs to read PSS/SSS and to perform the RSRP/RSRQ measurements. Related to the coverage enhancement is support for multiple enhancement levels. In fcMTC, there is support to operate under different coverage enhancement levels (e.g., CEModeA/normal coverage and CEModeB/enhanced coverage). Typically, the measurement requirements under enhanced coverage are more relaxed (i.e., they take longer time) compared to the normal coverage because a UE needs to collect more samples or receive more repetitions to be able to successfully measure/decode under low SNR (Ês/Iot) levels. The measurement gaps occur periodically (e.g., every 40 ms or every 80 ms depending on the configuration). In enhanced coverage the measurement time is substantially longer than in normal coverage. This means under gap sharing between intra-frequency and inter-frequency measurements, the measurement time under enhanced coverage will become even longer. This will severely degrade mobility performance which relies on the measurements.

Particular embodiments obviate the problems described above and include a UE measurement procedure for a UE whose radio frequency bandwidth is less than a serving cell bandwidth by a particular margin (by at least X MHz, e.g., UE bandwidth=1.4 MHz, serving cell BW=5 MHz). The UE uses gaps for performing measurements on a serving carrier. The gaps may be shared between measurements on serving and non-serving carriers.

According to some embodiments, the UE adapts a percentage of measurement gaps used for performing measurements on one or more carriers based on the UE coverage enhancement level (e.g., normal or enhanced coverage level) with respect to a cell (e.g., with respect to the serving cell). For example, the UE in normal coverage with respect to the serving cell uses smaller percentage (e.g., X=60%) of measurement gaps for performing measurements on carrier(s) compared to the scenario when the UE is in enhanced coverage with respect to the serving cell.

Particular embodiments facilitate UEs in different coverage levels to perform measurement on non-serving carriers that require gaps and meet the corresponding requirements. The measurement gaps may be used more efficiently. Overall UE measurement performance may be enhanced, which in turn enhances the mobility performance. For example, even in enhanced coverage the measurement time of cells on a carrier remains within an acceptable limit.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-6 of the drawings, like numerals being used for like and corresponding parts of the various drawings. LTE and New Radio (NR) (e.g., 3GPP 5G) are used throughout this disclosure as an example cellular system, but the ideas presented herein may apply to other wireless communication systems as well.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120, such as base stations (e.g., eNodeBs/eNBs in LTE or gNodeBs/gNBs in NR). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication.

Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless network 100 may include a carrier bandwidth of, for example, 20 MHz. Wireless device 110 may operate on a subset of the carrier bandwidth. For example, wireless device 110 may use a reduced bandwidth of 1.4 MHz (i.e., six physical resource blocks (PRBs)).

Some embodiments use the general term "network node," which may correspond to any type of radio network node or any network node that communicates with a UE (wireless device) and/or with another network node. Examples of network nodes include NodeB, master eNB (MeNB), secondary eNB (SeNB), a network node belonging to a master cell group (MCG) or secondary cell group (SCG), base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g., mobile switching center (MSC), mobility management entity (MME), etc.), operation and maintenance (O&M), operation support system (OSS), self-organizing network (SON), positioning node (e.g., evolved serving mobile location center (E-SMLC)), minimization of drive test (MDT) node, test equipment (physical node or software), etc.

In some embodiments the non-limiting term user equipment (UE) or wireless device is used and it refers to any type of wireless device communicating with a network node and/or with another UE in a cellular or mobile communication system. Examples of a UE include target device, device-to-device (D2D) UE, machine type UE or UE capable of M2M communication, personal digital assistant (PDA), personal access device (PAD), tablet, mobile terminals, smart phone, laptop embedded equipped (LEE), laptop mounted equipment (LME), USB dongles, proximity services (ProSe) UE, vehicle-to-vehicle (V2V) UE, vehicle-to-X (V2X) UE, etc.

Particular embodiments are described with respect to LTE. However, the embodiments are applicable to any RAT or multi-RAT systems where a UE receives and/or transmit signals (e.g., data) such as LTE FDD/TDD, WCDMA/HSPA, GSM/GERAN, Wi Fi, WLAN, CDMA2000, 5G, NR, etc.

The term "radio measurement" (or measurements) used herein may refer to any measurement performed on radio signals. Examples of radio signals include discovery reference signals (DRS). Examples of DRS include positioning reference signal (PRS), cell-specific reference signal (CRS), Channel State Information Reference Signal (CSI-RS), PSS, SSS, etc. In another example, DRS can be any periodic signal with a configurable or pre-defined periodicity or signals based on a time-domain pattern. In another specific example, DRS signals are as specified in 3GPP 36.211.

Radio measurements can be absolute or relative. Radio measurements can be e.g., intra-frequency, inter-frequency, carrier aggregated (CA), etc. Radio measurements can be unidirectional (e.g., downlink (DL) or uplink (UL)) or bidirectional (e.g., round trip time (RTT), Rx-Tx, etc.). Some examples of radio measurements: timing measurements (e.g., time of arrival (TOA), timing advance, RTT, reference signal time difference (RSTD), subframe time difference (SSTD), Rx-Tx, propagation delay, etc.), angle measurements (e.g., angle of arrival), power-based measurements (e.g., RSRP, RSRQ, signal to interference-plus-noise ratio (SINR), SNR, interference power, total interference plus noise, received signal strength indicator (RSSI), noise power, channel quality information (CQI), channel state information (CSI), pre-coding matrix indicator (PMI), etc.), cell detection or cell identification, beam detection or beam identification, radio link monitoring (RLM), system information reading, etc.

Performing a measurement on a carrier may include performing measurements on signals of one or more cells operating on that carrier or performing measurements on signals of the carrier (i.e., carrier specific measurement such as RSSI). Examples of cell specific measurements are signal strength, signal quality etc.

The term measurement performance used herein may refer to any criteria or metric which characterizes the performance of the measurement performed by a radio node e.g., UE. The term measurement performance is also called as measurement requirement, measurement performance requirements etc. The radio node has to meet one or more measurement performance criteria related to the performed measurement. Examples of measurement performance criteria are measurement time, number of cells to be measured with the measurement time, measurement reporting delay, measurement accuracy, measurement accuracy with respect to a reference value (e.g., ideal measurement result) etc. Examples of measurement time are measurement period, cell identification period, evaluation period, etc.

The coverage level of the UE may be defined with respect to any cell e.g., serving cell, non-serving cell, neighbor cell etc. The coverage level is also interchangeably called as the coverage enhancement (CE) level. For example, the CE level with respect to a cell can be expressed in terms of signal level received at the UE from that cell. Alternatively, the CE level of the UE with respect to a cell can be expressed in terms of signal level received at the cell from the UE. As an example, received signal level can be expressed in terms of received signal quality and/or received signal strength at the UE with respect to the cell. More specifically the coverage level may be expressed in terms of: (a) received signal quality and/or received signal strength at the UE with respect to a cell; and/or (b) received signal quality and/or received signal strength at the cell with respect to the UE.

Examples of signal quality include SNR, SINR, CQI, RSRQ, narrowband RSRQ (NRSRQ), CRS Ês/Iot, sync channel Ês/Iot, SCH Ês/Iot, etc. Examples of signal strength include path loss, path gain, RSRP, narrowband RSRP (NRSRP), sync channel received power, SCH RP, etc. The notation Ês/Iot is defined as a ratio of Ês, which is the received energy per resource element (power normalized to the subcarrier spacing) during the useful part of the symbol (i.e., excluding the cyclic prefix) at the UE antenna connector, to Iot which is the received power spectral density of the total noise and interference for a certain resource element (power integrated over the RE and normalized to the subcarrier spacing) as measured at the UE antenna connector.

The CE level is also expressed in terms of two or more discrete levels or values e.g., CE level 1, CE level 2, CE level 3 etc. A particular example may include 2 coverage levels defined with respect to signal quality (e.g., SNR) at the UE comprising: (a) coverage enhancement level 1 (CE1) comprising SNR≥−6 dB at UE with respect to a cell; and (b) coverage enhancement level 2 (CE2) comprising −15 dB≤SNR<−6 dB at UE with respect to a cell.

In the above example the CE1 may also be interchangeably called as normal coverage level, baseline coverage level, reference coverage level, legacy coverage level etc. CE2 may be referred to as enhanced coverage or extended coverage level.

In another example two different coverage levels (e.g., normal coverage and enhanced coverage) may be defined in terms of signal quality levels as follows. The requirements for normal coverage are applicable for the UE category NB1 with respect to a cell provided that radio conditions of the UE with respect to that cell are defined as follows SCH Ês/Iot≥−6 dB and CRS Ês/Iot≥−6. The requirements for enhanced coverage are applicable for the UE category NB1 with respect to a cell provided that radio conditions of the UE with respect to that cell are defined as follows SCH Ês/Iot≥−15 dB and CRS Ês/Iot≥−15.

In the above examples Ês/Iot is the ratio of received power per subcarrier to the total interference including noise per subcarrier.

In existing solutions (e.g., in increased carrier monitoring (IncMon) feature), the gaps are shared between different carrier groups, wherein each group has different priorities. The carrier groups are known as normal performance group (NPG) and reduced performance group (RPG). The NPG and RPG are considered to be of higher priority level and lower priority level, respectively. Because NPG carriers are higher priority, NPG carriers are allocated a larger number of gaps compared to RPG carriers. However, carriers in NPG or RPG may have any coverage level.

The embodiments described herein are different from the existing solution at least in terms of the condition used for sharing the gaps. In certain embodiments described herein, the gaps are shared based on a relation between the UE radio frequency bandwidth and cell bandwidth, and based on the coverage enhancement level of the UE, which is different from the existing solution.

The embodiments described herein may apply to any RRC state, e.g., RRC_CONNECTED or RRC_IDLE.

In particular embodiments, wireless device 110 may determine a relation between a radio frequency bandwidth of wireless device 110 (e.g., 1.4 MHz) and a serving cell 115 bandwidth (e.g., 20 MHz). Wireless device 110 may receive a request to measure on non-serving carriers (e.g., inter-frequency carriers and inter-RAT carriers). Wireless device 110 may determine its coverage level and obtain information about measurement gap information based on its determined coverage level. Wireless device 110 may perform, based on the obtained measurement gap information, measurements on non-serving carriers and send the result of the performed measurement to another node, such as network node 120. Wireless device 110 may use the result of the performed measurement for one or more operational tasks.

In wireless network 100, each network node 120 may use any suitable radio access technology, such as long term evolution (LTE), LTE-Advanced, NR, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 4A below. Similarly, a network node may include any suitable combination of hardware and/or software. For example, in particular embodiments, a network node, such as network node 120, may include the components described with respect to FIG. 5 below.

Particular embodiments include a method in a wireless device. An example is illustrated in FIG. 2.

Figure 2:
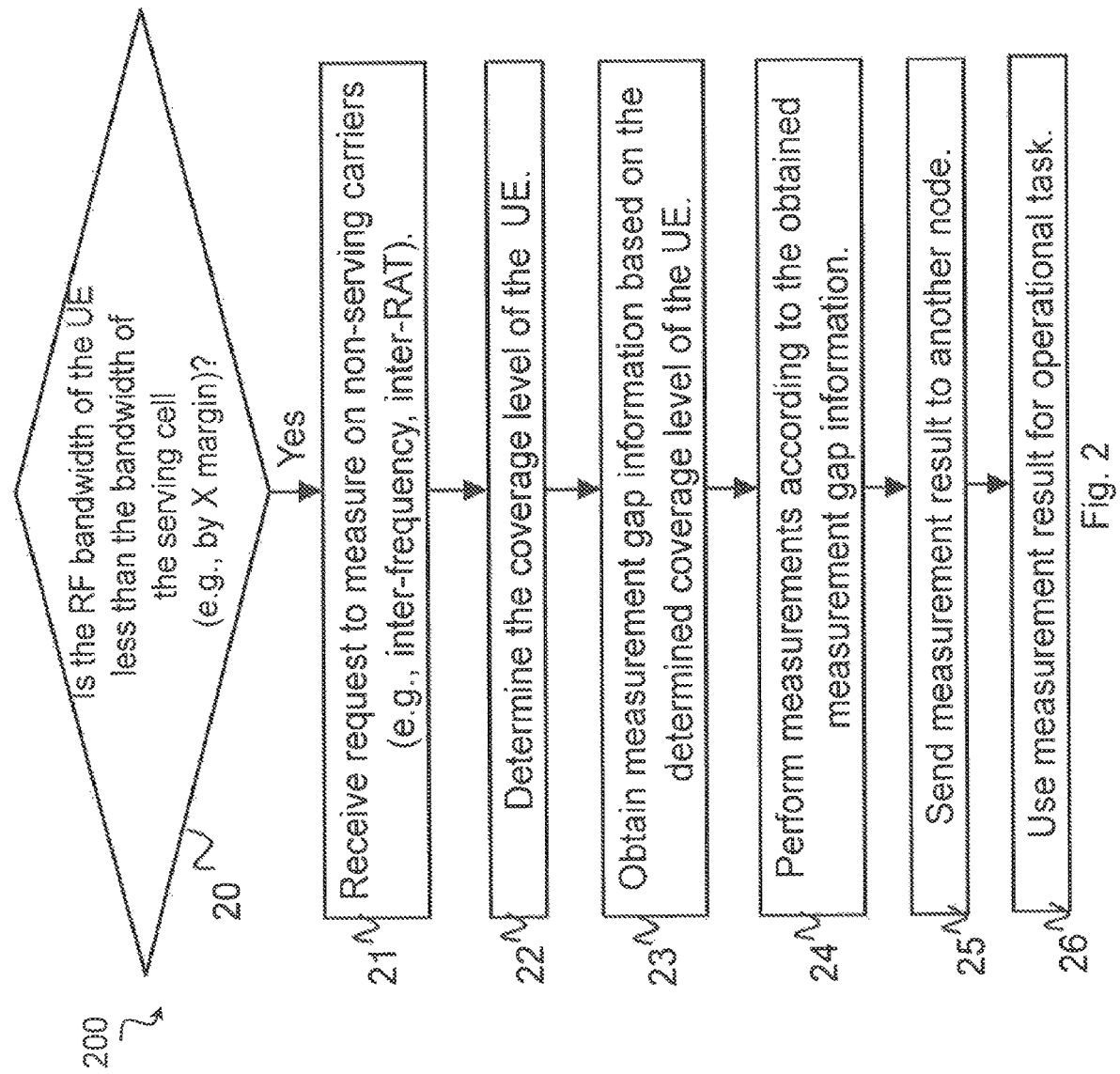
FIG. 2 is a flow diagram illustrating an example method for use in a wireless device, according to some embodiments.

FIG. 2 is a flow diagram illustrating an example method 200 for use in a wireless device, according to some embodiments. In particular embodiments, one or more steps of FIG. 2 may be performed by components of wireless network 100 described with respect to FIG. 1. For example, the steps of FIG. 2 may be performed by wireless device 110.

The method begins at step 20, where a wireless device determines a relation between the wireless device radio bandwidth and a serving cell bandwidth. For example, wireless device 110 may determine it uses a bandwidth of 1.4 MHz and its serving cell 115 may use a bandwidth of 20 MHz.

In particular embodiments the wireless device radio frequency bandwidth refers to the max wireless device radio frequency bandwidth supported by the wireless device or the wireless device radio frequency configured by the network node. In the former case, the wireless device radio frequency bandwidth is known to the wireless device because this is related to the wireless device radio frequency architecture. In the latter case, the wireless device determines its radio frequency bandwidth based on the bandwidth configuration information received from the network node.

In particular embodiments, the wireless device determines the serving cell bandwidth by receiving information from the network node. The cell bandwidth may be transmitted in a broadcast channel. For example, the wireless device can determine the bandwidth of a cell by reading the broadcast channel (e.g., physical broadcast channel (PBCH) or narrowband PBCH (NPBCH)) of that cell. Two scenarios include: (a) wireless device radio frequency bandwidth is less than the serving cell bandwidth; or (b) wireless device radio frequency bandwidth is equal to the serving cell bandwidth. Particular embodiments apply for the first scenario, which can be illustrated as in FIG. 3.

Figure 3:
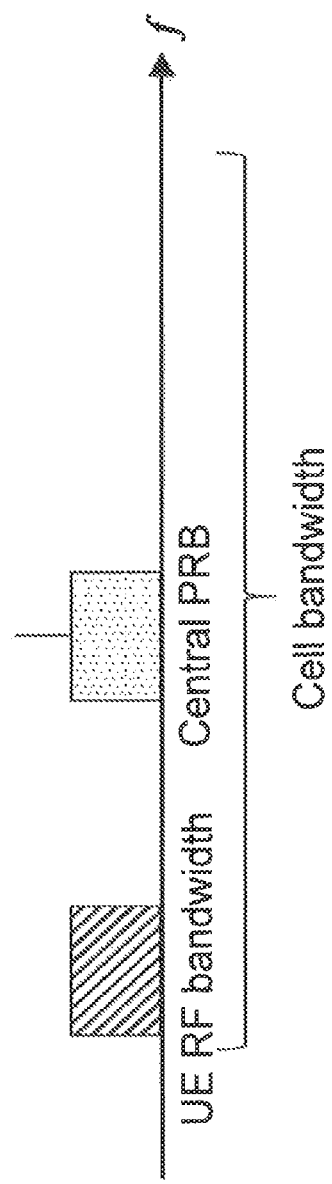
FIG. 3 illustrates an example UE radio frequency bandwidth and cell bandwidth location in the frequency domain.

FIG. 3 illustrates an example UE radio frequency bandwidth and cell bandwidth location in the frequency domain. FIG. 3 shows that the UE radio frequency bandwidth is different from the center frequency of the serving cell bandwidth. This means that the UE will need to retune to the center frequency (i.e., the central 6 PRBs) to measure on the synchronization signals (PSS/SSS) and to receive broadcast channels PBSCH to obtain the master information block (MIB).

Typically, the RRM measurements are performed in parallel to the synchronization signals measurements, which means that also the radio resource management (RRM) measurements such as RSRP/RSRQ are performed in the center frequency. Because the UE radio frequency bandwidth of MTC devices can be smaller than the serving cell bandwidth, as in scenario 1, the wireless device may need measurement gaps to also measure on cells of intra-frequency carriers, i.e., serving and neighbor cells on the serving carrier. Consequently, the measurement requirements for such UEs are also specified assuming measurement gaps and the exact requirements may depend on the configured measurement gap pattern ID. For example, the measurement requirements for a UE with gap pattern ID #1 (i.e., every 80 ms) are longer than those configured with gap pattern ID #0 (i.e., every 40 ms).

Returning to FIG. 2, the method continues to step 21 where the wireless device receives a request to measure on a non-serving carrier. For example, wireless device may receive a request from network node 120 to measure on a non-serving carrier, such as inter-frequency carriers and inter-RAT carriers.

Such request may typically come from the higher layers (e.g., using dedicated RRC signaling). In some examples, the wireless device may start measuring based on information received in a broadcast channel, e.g., telling the wireless device which frequencies (e.g., inter-frequency) and which RAT (inter-RAT) carriers to measure on. Such information may include information on Evolved Absolute Radio Frequency Channel Number (EARFCN), carrier frequency (e.g., F1, F2 etc.), bandwidth information, etc.

At step 22, the wireless device determines its coverage enhancement (CE) level. The coverage level may be with respect to a node (e.g., the serving eNode, serving cell, neighbor cell, etc.) to which the wireless device reports the results of the measurements. In some examples, the coverage level determination may also be with respect to another cell on a non-serving carrier on which the wireless device is to perform one or more measurements.

In one example, the wireless device may determine its CE level with respect to the node based on indication received from the network node (e.g., whether the wireless device is configured with CE Mode A (i.e., normal coverage level) or with CE Mode B (enhanced coverage level)). In one example, the wireless device may determine its CE level with respect to the node during a random access procedure (e.g., based on number of PRACH repetition used by the wireless device in the cell). For example, a certain number of PRACH repetitions required to successfully transmit random access to a cell can be mapped to certain CE level. In another example the wireless device may determine its CE level with respect to the node based on one or more radio measurements and pre-defined rule (e.g., in normal coverage if the SINR≥−6 dB or in enhanced coverage if the SINR<−6 dB).

At step 23, the wireless device obtains information related to measurement gap based on the determined coverage level. For example, wireless device 110 may obtain measurement gap information based on enhanced coverage level.

Particular embodiments may include two tables describing how the gaps are to be split between intra-frequency and inter-frequency measurements based on the determined coverage level of the wireless device with respect to a cell (e.g., with respect to serving cell, with respect to measurement cell). The tables may be associated with different coverage levels.

The wireless device may choose the table that matches its determined coverage level. In one specific example, it is assumed that the wireless device can operate between two different coverage levels or coverage modes, namely CEModeA and CEModeB. The coverage modes with respect to the serving cell can be signaled by the network node. Based on the determined coverage mode, the wireless device chooses one of the tables (see examples below) and performs measurements accordingly.

If the wireless device is determined to be in coverage mode CEModeA, then the wireless device performs measurements on non-serving carriers according to the gap configuration in Table 2. Similarly, if the wireless device is determined to be in coverage mode CEModeB, then it performs measurement according gap configuration in Table 3.

Each value of X in the tables describes the percentage of the gaps that are used for intra-frequency measurements while the remaining percentage (100−X) are used for the inter-frequency measurements. The difference between Table 2 and Table 3 is that in Table 3 (for CEModeB), X has relatively higher values meaning that the wireless device may use more gaps for measurements on intra-frequency carriers (including the serving cell) compared to the gaps for measurements on non-serving carriers. The rationale is that the measurements in CEModeB are more challenging due to lower received signal level (e.g., lower SINR with respect to SINR in normal coverage) and therefore may require longer time.

It is also for this reason that the CEModeB measurement requirements are more relaxed compared CEModeA. For example, the measurement period of measurements performed in CEModeB is longer compared to the measurement period of measurements performed in CEModeA. Because the wireless device is in CEmodeB, the serving cell measurements are also challenging, and because the serving cell measurements are used for various RRM procedures and operational tasks, it is necessary for the wireless device to perform measurements according to Table 3. Otherwise, there is a high risk that the wireless device may fail with the serving cell procedures.

As an example, the wireless device may need 2000 ms and 4000 ms to do in-sync and out-of-sync evaluations respective for RLM in CEModeB in non-discontinuous receive (non-DRX). This can be compared to in-sync and out-of-sync evaluation periods of 200 ms and 400 ms, respectively, for CEModeA in non-DRX.

Another difference between Table 2 and Table 3 is that the resolution in the signaled values can be different. In Table 3, the resolution can be much finer compared to Table 2. Because the values that are signaled in Table 3 are higher due to the difference in coverage level and the possible values that can be signaled is the same (e.g., 4) in both cases, the resolution in the second table is higher. For example, the resolution may be 70%, 75%, 80% and 85% instead of 50%, 60%, 70% and 80%.

Choosing the tables (Table 2 or Table 3) for splitting gaps between serving and non-serving carriers according to its coverage level may enable the wireless device to meet the requirements. On the other hand, if the wireless device is in CEModeA, by not choosing Table 3, the wireless device may avoid excess or unusable gaps. Instead they can be used for measuring on more number of inter-frequency (including inter-RAT carriers). In this way, the wireless device more efficiently uses the gaps.

The values of Table 2 and 3 (as shown here) may be specified in a specification (e.g., 3GPP TS 36.133) when specifying UE requirements for measurements under different CE levels.

TABLE 2

Value of parameter X for CEModeA

| Network signaling ParameterName (to be determined by RAN2) | Value of X (%) |
|---|---|
| '00' | 50 |
| '01' | Equal split |
| '10' | 60 |
| '11' | 70 |

When '01' is signaled, the value of X is calculated as $100/N_{freq}$, where $N_{freq}$ is the total number of carrier including intra- and inter-frequency carriers.

TABLE 3

Value of parameter X for CEModeB

| Network signaling ParameterName (to be determined by RAN2) | Value of X (%) |
|---|---|
| '00' | 70 |
| '01' | 75 |
| '10' | 80 |
| '11' | 85 |

Although the examples in Tables 2 and 3 each illustrate four network signaling parameters (00, 01, 10, and 11), other embodiments may use tables with more or fewer network signaling parameters. Similarly, although the examples in Tables 2 and 3 illustrate certain values for X, other embodiments may use tables with different values of X. Additionally, the example uses two tables (e.g., based on the assumption that the wireless device in the example only supports two coverage levels), the same principle can be applied for any number of coverage levels. In the case of more than two coverage levels, certain embodiments may provide a separate table for each coverage level. Other embodiments may provide one table containing values of X associated with a group of coverage levels (e.g., one table for 2 coverage levels).

In some embodiments, the same table (e.g., a single table) may be used for determining the amount of measurement gaps to use for intra-frequency and inter-frequency (non-serving carriers) measurements regardless of the determined measurement gap. However, the wireless device may use certain values when it is in CEModeA and other values when it is CEModeB. An example is illustrated in Table 4A and 4B below.

TABLE 4A

Using single table for signalling the gap split for multiple coverage modes (first example)

| Network signaling ParameterName (to be determined by RAN2) | Value of X (%) | |
|---|---|---|
| '00' | 50 | } CEModeA |
| '01' | Equal split | |
| '10' | 70 | } CEModeB |
| '11' | 80 | |

TABLE 4B

Using single table for signalling the gap split for multiple coverage modes (second example)

| Network signaling ParameterName (to be determined by RAN2) | Value of X (%) | |
|---|---|---|
| '00' | 50 | } CEModeA |
| '01' | 70 | |
| '10' | 80 | } CEModeB |
| '11' | 90 | |

In the example in Table 4A, the wireless device may perform one or more measurements according to any of first two values in the table when determined coverage level (in previous step) is CEModeA, and it may use last two values in the table when the determined coverage level is CEModeB. This can be done autonomously by the wireless device based on its coverage levels, or this can also be signaled by the network node, i.e., when the UE is in a certain mode the network node may only signal certain values in the table. In yet another example, the wireless device may use only the first value when it is in a certain coverage mode (e.g., CEModeA) and all remaining values (3 values) are used for the enhanced coverage levels (e.g., CEModeB) as shown in Table 4B.

Also, here, although the principle is exemplified using two coverage levels (CEModeA and CEModeB), the same principle can be used for any number of coverage levels.

In some embodiments, multiple tables (e.g., 2) may be used for specifying the gap sharing split between intra-frequency and inter-frequency carriers. However, the total number of values that are possible to signal or that are possible for the wireless device to choose among is still the same. One reason is that it can reduce the signaling and another reason is that the number of bits used for specifying the possible values can be limited. This is exemplified in Table 5 below.

TABLE 5

Using multiple tables to specify the gap split between intra-frequency and inter-frequency measurements with limited number of reporting values based on coverage level

| Network signaling ParameterName (to be determined by RAN2) | Value of X (%) |
|---|---|
| A) CEModeA | |
| '00' | 50 |
| '01' | Equal |
| B) CEModeB | |
| '00' | 70 |
| '01' | 75 |

In the example in Table 5, 2 bits (4 values) are used for signaling the possible gap split out of which the first bit is used for signaling or specifying the gap split for one type of coverage level (e.g., CEModeA) and the second bit is used for signaling or specifying the gap split of another coverage level (e.g., CEModeB). As in previous examples, the percentage of gaps used for intra-frequency measurements are higher in case B than in case A. The reason is the same as explained above, i.e., the measurements under coverage enhancement can be challenging and it may require the wireless device to sample over a longer time in order to measure. Thus, the measurement period is longer. Because measurements are performed over the gaps and intra-frequency measurement (serving cell measurements) are important, it is reasonable to allocate more gaps under enhanced coverage compared to the gaps under normal coverage.

In some embodiments, the network node includes one common table containing values of X, which can be defined as shown in Table 6. But the network node configures the wireless device with the values of X based on the wireless device coverage enhancement level. For example, smaller values of X (e.g., X=50% and 60%) are configured by the network node when the wireless device is in normal coverage (CEModeA) and larger values of X (e.g., X=70% and 80%) are configured by the network node when the wireless device is in enhanced coverage (e.g., CEModeB).

TABLE 6

| Value of parameter X: smaller values for CEModeA and larger for CEModeB | |
|---|---|
| Network signaling ParameterName (to be determined by RAN2) | Value of X (%) |
| '00' | 50 |
| '01' | 60 |
| '10' | 70 |
| '11' | 80 |

At step 24, the wireless device performs measurements on the intra-frequency carrier and the inter-frequency carriers according to the obtained measurement gap information in previous step. For example, wireless device 110 may perform measurements according to the gap allocation in any of the example tables above.

Performing a measurement may comprise, e.g., any one or more of: obtaining a measurement result (a.k.a. result of the measurement), configuring or (re)tuning the receiver bandwidth, configuring measurement gaps (which may cause interruptions in transmissions and receptions from and by the wireless device), configuring or (re)tuning the receiver to receive signals in the measurement gaps, obtaining one or more measurement samples, combining two or more measurement samples into a measurement.

At step 25, in some embodiments, the wireless device sends a result of the performed measurements (intra-frequency and inter-frequency measurements) to another node. For example, wireless device 110 may send the results to network node 120.

Examples of the may include result: measurement result (e.g., RSRP, RSRQ, power measurement, time measurement, time difference measurement, rx-tx time difference measurement, angle of arrival (AoA), cell ID, beam ID, etc.), a log with the logged measurement (e.g., like in MDT in RRC_IDLE or when the measurements are performed in RRC_IDLE), location of the wireless device determined based on the measurements, link failure indication, measurement problem indication.

Sending the result may also need to be adapted to the steps described above, e.g., how and when the wireless device will report (the wireless device is generally required to report with a short predefined time after the measurements have become available and this time depends on the measurement time which in turn depends on how the measurements are performed and whether/how the gaps were used and shared for the measurements). For example, if gaps are shared so that inter-frequency measurements get less resources in one case and more resources in another case, then the same measurement will be reported in time T1 and T2 (T2 is shorter than T1), respectively.

At step 26, in some embodiments, the wireless device uses a result of the performed measurement (intra-frequency, inter-frequency, inter-RAT measurements) for one or more operational tasks. For example, wireless device 110 may perform an operational task such as positioning or location determination of the wireless device, RRM, cell change or handover, performing RLM, SON, MDT, receiver configuration optimization, logging the result for statistics, saving the gap sharing configuration, etc.

Modifications, additions, or omissions may be made to method 200. Additionally, one or more steps in method 200 of FIG. 2 may be performed in parallel or in any suitable order. The steps of method 200 may be repeated over time as necessary.

The following list provides non-limiting examples of how certain aspects of the proposed solutions could be implemented. The examples are merely intended to illustrate how certain aspects of the proposed solutions could be implemented, however, the proposed solutions could also be implemented in other suitable manners. Examples include:

1. A method for use in a wireless device, the method comprising:
   determining a relation between a wireless device radio frequency bandwidth and a serving cell bandwidth;
   receiving a request to measure on a non-serving carrier;
   determining a coverage level of the wireless device;
   obtaining information about measurement gap information based on the determined coverage level; and
   performing, based on the obtained measurement gap information, measurements on the non-serving carrier.
2. The method of example 1, further comprising sending the result of the performed measurement to another node.
3. The method of any of examples 1-2, further comprising using the result of the performed measurement for one or more operational tasks.
4. The method of any of examples 1-3, wherein the non-serving carrier comprises an inter-frequency carrier or an inter-RAT carrier.
5. The method of any of examples 1-4, wherein the coverage level comprises at least one of CEModeA or CEModeB.
6. The method of any of examples 1-5, wherein the information about the coverage gap comprises an allocation of coverage gaps between intra-frequency measurements and inter-frequency measurements.
7. A wireless device comprising processing circuitry operable to perform the method of any of examples 1-6.

FIG. 4A is a block diagram illustrating an example embodiment of a wireless device. The wireless device is an example of the wireless devices 110 illustrated in FIG. 1. In particular embodiments, the wireless device is capable of receiving a request to measure on a non-serving carrier; determining a coverage level of the wireless device; obtaining information about measurement gap information based on the determined coverage level; and performing, based on the obtained measurement gap information, measurements on the non-serving carrier.

Particular examples of a wireless device include a mobile phone, a smart phone, a PDA (Personal Digital Assistant), a portable computer (e.g., laptop, tablet), a sensor, a modem, MTC device, M2M device, laptop embedded equipment (LEE), laptop mounted equipment (LME), USB dongles, a device-to-device capable device, a vehicle-to-vehicle device, or any other device that can provide wireless communication. The wireless device includes processing circuitry 400. In the example illustrated in FIG. 4A, processing circuitry 400 includes transceiver 410, processor 420, memory 430, and power source 440. In some embodiments, transceiver 410 facilitates transmitting wireless signals to and receiving wireless signals from wireless network node 120 (e.g., via an antenna), processor 420 executes instructions to provide some or all of the functionality described herein as provided by the wireless device, and memory 430 stores the instructions executed by processor 420. Power source 440 supplies electrical power to one or more of the components of wireless device 110, such as transceiver 410, processor 420, and/or memory 430.

Processor 420 includes any suitable combination of hardware and software implemented in one or more integrated circuits or modules to execute instructions and manipulate data to perform some or all of the described functions of the wireless device. In some embodiments, processor 420 may include, for example, one or more computers, one or more programmable logic devices, one or more central processing units (CPUs), one or more microprocessors, one or more applications, and/or other logic, and/or any suitable combination of the preceding. Processor 420 may include analog and/or digital circuitry configured to perform some or all of the described functions of wireless device 110. For example, processor 420 may include resistors, capacitors, inductors, transistors, diodes, and/or any other suitable circuit components.

Memory 430 is generally operable to store computer executable code and data. Examples of memory 430 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 440 is generally operable to supply electrical power to the components of wireless device 110. Power source 440 may include any suitable type of battery, such as lithium-ion, lithium-air, lithium polymer, nickel cadmium, nickel metal hydride, or any other suitable type of battery for supplying power to a wireless device.

In particular embodiments, processor 420 in communication with transceiver 410 receives a request to measure on a non-serving carrier; determines a coverage level of the wireless device; obtains information about measurement gap information based on the determined coverage level; and performs, based on the obtained measurement gap information, measurements on the non-serving carrier.

Other embodiments of the wireless device may include additional components (beyond those shown in FIG. 4A) responsible for providing certain aspects of the wireless device's functionality, including any of the functionality described above and/or any additional functionality (including any functionality necessary to support the solution described above).

FIG. 4B is a block diagram illustrating example components of a wireless device 110. The components may include receiving module 450, determining module 452, obtaining module 454, and measuring module 456.

Receiving module 450 may perform the receiving functions of wireless device 110. For example, receiving module 450 may receive a request to measure a non-serving carrier according to any of the examples and embodiments described above. In certain embodiments, receiving module 450 may include or be included in processor 420. In particular embodiments, receiving module 450 may communicate with determining module 452, obtaining module 454 and measuring module 456.

Determining module 452 may perform the determining functions of wireless device 110. For example, determining module 452 may determine a coverage level of wireless device 110 according to any of the examples and embodiments described above. In certain embodiments, determining module 452 may include or be included in processor 420. In particular embodiments, determining module 452 may communicate with receiving module 450, obtaining module 454 and measuring module 456.

Obtaining module 454 may perform the obtaining functions of wireless device 110. For example, obtaining module 454 may obtain gap information based on the determined coverage level according to any of the examples and embodiments described above. In certain embodiments, obtaining module 454 may include or be included in processor 420. In particular embodiments, obtaining module 454 may communicate with receiving module 450, determining module 452 and measuring module 456.

Measuring module 456 may perform the measuring functions of wireless device 110. For example, measuring module 456 may measure a non-serving carrier according to any of the examples and embodiments described above. In certain embodiments, measuring module 456 may include or be included in processor 420. In particular embodiments, measuring module 456 may communicate with receiving module 450, determining module 452 and obtaining module 454.

Figure 5:
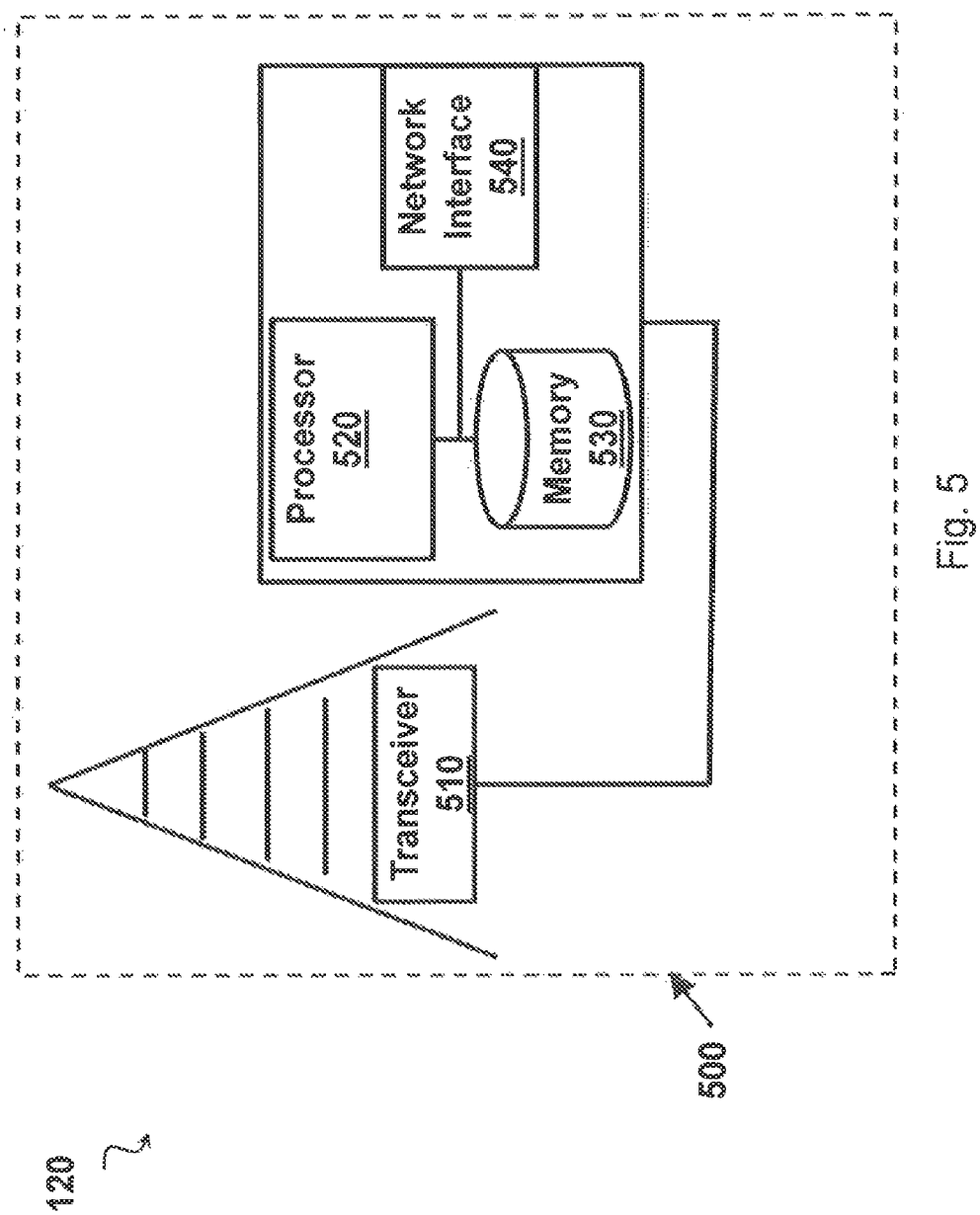
FIG. 5 is a block diagram illustrating an example embodiment of a network node.

FIG. 5 is a block diagram illustrating an example embodiment of a network node. The network node is an example of the network node 120 illustrated in FIG. 1. In particular embodiments, the network node may configure a wireless device to perform particular measurements and/or receive measurement results from the wireless device.

Network node 120 can be an eNodeB, a nodeB, a base station, a wireless access point (e.g., a Wi-Fi access point), a low power node, a base transceiver station (BTS), a transmission point or node, a remote radio unit (RRU), a remote radio head (RRH), or other radio access node. The network node includes processing circuitry 500. In the example illustrated in FIG. 5, processing circuitry 500 includes at least one transceiver 510, at least one processor 520, at least one memory 530, and at least one network interface 540. Transceiver 510 facilitates transmitting wireless signals to and receiving wireless signals from a wireless device, such as wireless devices 110 (e.g., via an antenna); processor 520 executes instructions to provide some or all of the functionality described above as being provided by a network node 120; memory 530 stores the instructions executed by processor 520; and network interface 540 communicates signals to backend network components, such as a gateway, switch, router, Internet, Public Switched Telephone Network (PSTN), controller, and/or other network nodes 120. Processor 520 and memory 530 can be of the same types as described with respect to processor 420 and memory 430 of FIG. 4A above.

In some embodiments, network interface 540 is communicatively coupled to processor 520 and refers to any suitable device operable to receive input for network node 120, send output from network node 120, perform suitable processing of the input or output or both, communicate to other devices, or any combination of the preceding. Network interface 540 includes appropriate hardware (e.g., port, modem, network interface card, etc.) and software, including protocol conversion and data processing capabilities, to communicate through a network.

In particular embodiments, processor 520 in communication with transceiver 510 may configure a wireless device to perform particular measurements and/or receive measurement results from the wireless device.

Other embodiments of network node 120 include additional components (beyond those shown in FIG. 5) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Figure 6:
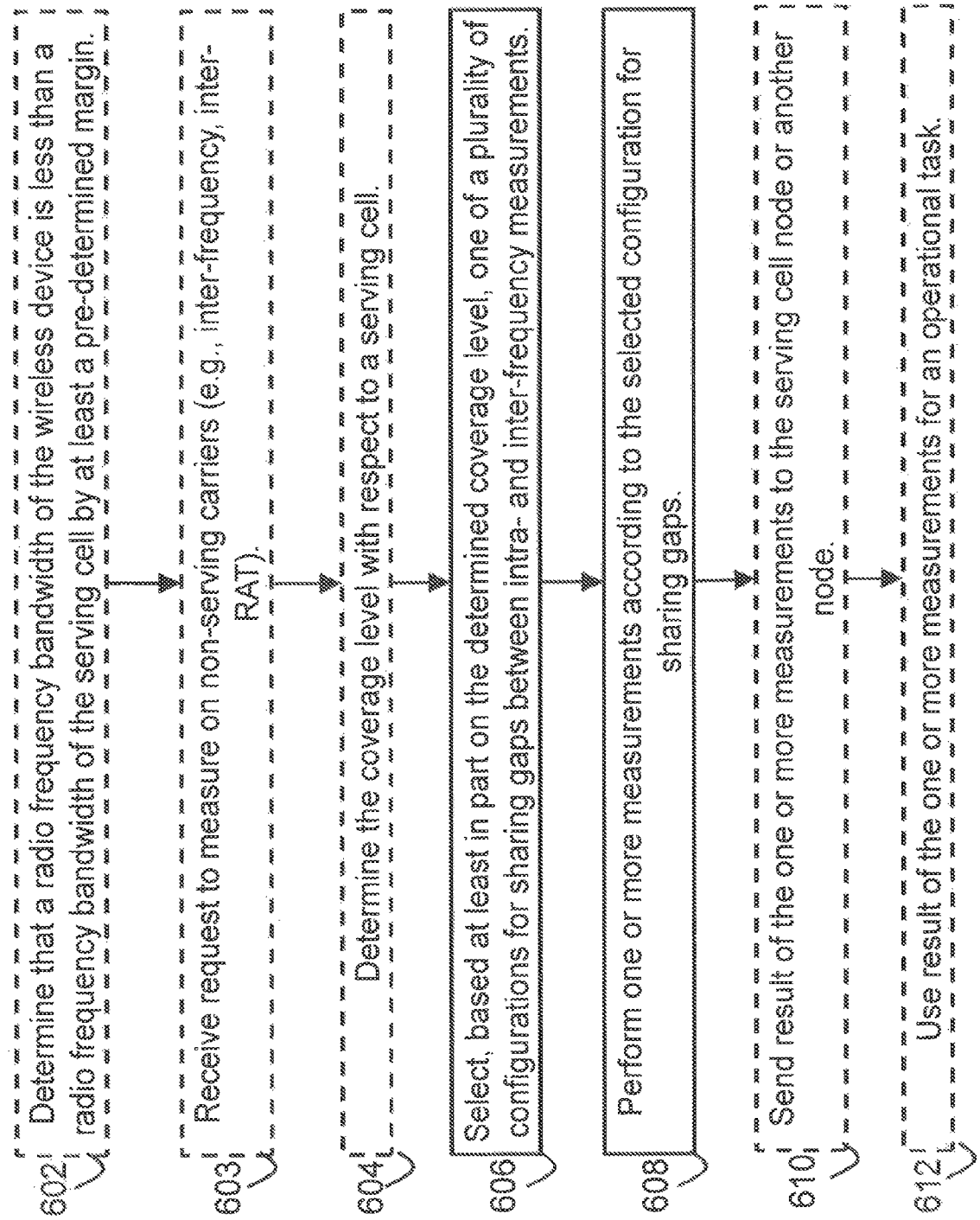
FIG. 6 is a flow diagram illustrating an example of a method that may be performed by the wireless device.

FIG. 6 illustrates another example of a method that may be performed by a wireless device, such as wireless device 110 discussed above, in accordance with certain embodiments of the present disclosure.

In some embodiments, the method begins with step 602 with determining that a radio frequency bandwidth of the wireless device is less than a radio frequency bandwidth of the serving cell by at least a pre-determined margin. Based at least in part on this determination, the wireless device may determine to use gap sharing according to the method of FIG. 6. FIG. 2 above provides additional examples and explanation related to determining whether the RF bandwidth of the wireless device (e.g., UE) is less than the RF bandwidth of the serving cell (see e.g., step 20 of FIG. 2).

In some embodiments, the method proceeds to step 603 with receiving a request to measure on one or more non-serving carriers (e.g., inter-frequency, inter-RAT). FIG. 2 above provides additional examples and explanation related to receiving a request to measure on non-serving carriers (see e.g., step 21 of FIG. 2). Receiving the request to measure on non-serving carriers may prompt the wireless device to perform steps for obtaining the gap sharing configuration to be used when measuring the non-serving carriers.

In some embodiments, the method optionally includes step 604 in which the method determines a coverage level of the wireless device with respect to a serving cell. Coverage level may be determined in any suitable manner, examples of which are described above with respect to step 22 of FIG. 2. As an example, the coverage level may be based at least in part on a signal quality and/or a signal strength of a signal that the wireless device receives from the serving cell. As another example, the coverage level may be based at least in part on a signal quality and/or a signal strength of a signal that the serving cell receives from the wireless device. As yet another example, the coverage level is based at least in part on a number of repetitions used by the wireless device during a random access procedure.

In some embodiments, the coverage level is determined from a plurality of coverage levels, which include at least a first coverage level and a second coverage level. Although certain embodiments may include additional coverage levels, the method of FIG. 6 will be described with reference to two coverage levels to simplify the explanation. In some embodiments, the first coverage level corresponds to a normal coverage level (e.g., CEModeA) and the second coverage level corresponds to a low coverage level (e.g., CEModeB). Normal and low coverage levels may be defined in any suitable manner. For example, in certain embodiments the normal coverage level comprises a signal-to-noise ratio $(SNR) \geq -6$ dB at the wireless device with respect to a signal received from the serving cell, and the low coverage level comprises an SNR $-15$ dB$\leq$SNR$<-6$ dB at the wireless device with respect to the signal received from the serving cell. In certain embodiments, the normal coverage level comprises SCH Ês/Iot$\geq -6$ dB and CRS Ês/Iot$\geq -6$, and the low coverage level comprises SCH Ês/Iot$\geq -15$ dB and CRS Ês/Iot$\geq -15$.

The method proceeds to step 606 with selecting one of a plurality of configurations for sharing gaps between intra- and inter-frequency measurements. The configuration is selected based at least in part on the determined coverage level. Examples of selecting a configuration for sharing gaps are described above with respect to step 23 of FIG. 2. In some embodiments, the method selects a first configuration for sharing gaps in response to determining that the coverage level corresponds to a first coverage level, and the method selects a second configuration for sharing gaps in response to determining that the coverage level corresponds to a second coverage level. For example, the first coverage level (e.g., CEModeA) may be associated with better coverage than the second coverage level (e.g., CEModeB) and therefore the first configuration for sharing gaps may allocate a higher percentage of gaps for inter-frequency measurements (100–X %) than the second configuration for sharing gaps. Conversely, the second coverage level (e.g., CEModeB) may be associated with worse coverage than the first coverage level (e.g., CEModeA) and therefore the second configuration for sharing gaps may allocate a higher percentage of gaps for intra-frequency measurements (X %) than the first configuration for sharing gaps.

In some embodiments, selecting the configuration for sharing gaps comprises using the determined coverage level to select one of a plurality of tables, wherein each table comprising one or more schemes that indicate how to share gaps between intra- and inter-frequency measurements. For, if at step 604 a determination was made that the coverage level corresponds to normal coverage, the method would select a table associated with normal coverage (examples include Table 2 and Table 5a discussed above). However, if at step 604 a determination was made that the coverage level corresponds to low coverage, the method would select a table associated with low coverage (examples include Table 3 and Table 5b discussed above). The one or more schemes associated with the table that corresponds to the normal coverage level allocates a higher percentage of gaps for inter-frequency measurements (100–X %) than the respective one or more schemes associated with the table that corresponds to a low coverage level. In other words, the low coverage level uses a higher percentage of gaps for intra-frequency measurements (X %).

Referring to Tables 2 and 3 above as examples, each table comprises four schemes (schemes 00, 01, 10, and 11). Each scheme allocates a pre-defined percentage of gaps (X %) for intra-frequency measurements such that a remaining percentage of gaps (100–X %) are allocated for inter-frequency measurements. The schemes associated with Table 2 (normal coverage) have a higher percentage of gaps allocated for inter-frequency measurements as compared to the respective schemes in Table 3 (low coverage). For example, Table 7 below is derived from Tables 2 and 3 for the purposes of explaining the differences between Tables 2 and 3. As can be seen, scheme 00 in normal coverage allocates 50% of gaps for inter-frequency measurements, which is higher than the respective scheme 00 in low coverage (which allocates 30% of gaps for inter-frequency measurements).

TABLE 7

Comparison of Schemes from Table 2 and Table 3

| | Derived from Table 2 | | Derived from Table 3 | |
|---|---|---|---|---|
| Scheme | Value of X (% of gaps for intra-frequency measurements), normal coverage | Value of 100-X (% of gaps for inter-frequency measurements), normal coverage | Value of X (% of gaps for intra-frequency measurements), low coverage | Value of 100-X (% of gaps for inter-frequency measurements), low coverage |
| 00 | 50 | 50 | 70 | 30 |
| 01 | Equal Split | Equal Split | 75 | 25 |
| 10 | 60 | 40 | 80 | 20 |
| 11 | 70 | 30 | 85 | 15 |

Although the previous example has been described in terms of using the coverage level determined at step 604 to select a table that is associated with the coverage level, other embodiments of step 606 use the coverage level determined at step 604 to select a portion of a table that is associated with the determined coverage level. Each portion of the table comprises one or more schemes that indicate how to share gaps between intra- and inter-frequency measurements. For example, if at step 604 a determination was made that the coverage level corresponds to normal coverage, the method would select a portion of the table associated with normal coverage. Examples of portions of a table associated with normal coverage are provided above in Table 4a (schemes 00 and 01) and Table 4b (scheme 00). However, if at step 604 a determination was made that the coverage level corresponds to low coverage, the method would select a portion of the table associated with low coverage. Examples of portions of a table associated with low coverage are provided above in Table 4a (schemes 10 and 11) and Table 4b (schemes 01, 10, and 11).

As can be seen in Table 4a, in certain embodiments, the portion of the table associated with the low coverage level uses a higher percentage of gaps for intra-frequency measurements (X %) than the portion of the table associated with the normal coverage level. Table 4b provides another example in which the portion of the table associated with the low coverage level uses a higher percentage of gaps for intra-frequency measurements (X %) than the portion of the table associated with the normal coverage level.

At step 608, the method comprises performing one or more measurements according to the selected configuration for sharing gaps. An example is described above with respect to step 24 of FIG. 2. In some embodiments, the result of the one or more measurements may be used for any suitable purpose, such as sending the result to the serving cell node or another node in step 610 and/or using the result for an operational task in step 612. Examples of sending the result to the serving cell node or another node are described above with respect to step 25 of FIG. 2. Examples of operational tasks that may be performed using the result of the one or more measurements are described above with respect to step 26 of FIG. 2. The method then ends.

Figure 7:
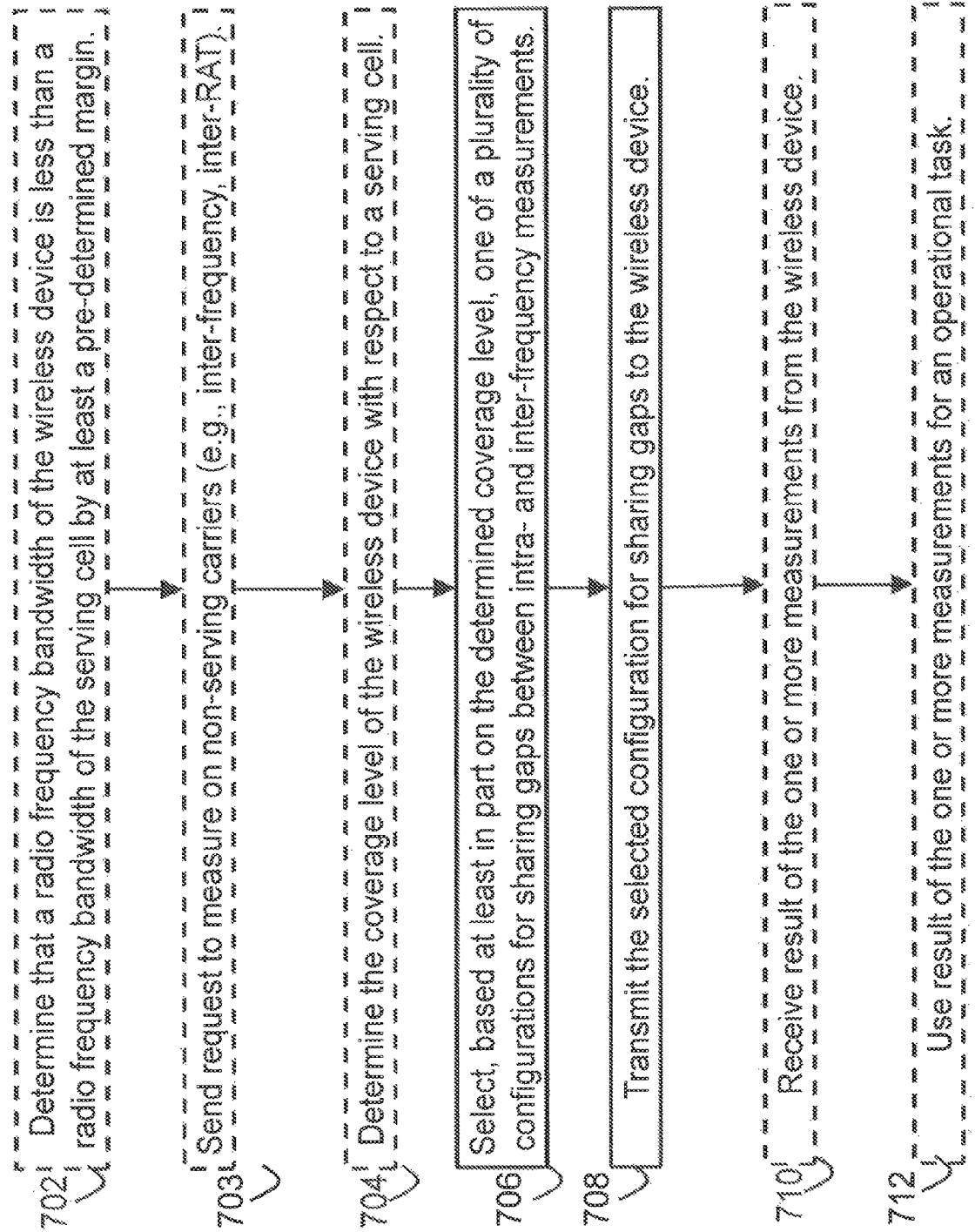
FIG. 7 is a flow diagram illustrating an example of a method that may be performed by the network node.

FIG. 7 illustrates an example of a method that may be performed by a network node, such as network node 120 described above, in accordance with certain embodiments. In some embodiments, the network node 120 comprises the serving cell for a wireless device 110. At optional step 702, the network node determines that a radio frequency bandwidth of the wireless device is less than a radio frequency bandwidth of the serving cell by at least a pre-determined margin. At optional step 703, the network node sends a request for the wireless device to measure on non-serving carriers (e.g., inter-frequency, inter-RAT). At optional step 704, the network node determines the coverage level of the wireless device with respect to a serving cell. For example, the coverage level can be determined based on information received from the wireless device and/or based on measurements performed by the network node (such as signal quality or signal power measurements performed on a signal that the network node receives from the wireless device). Examples of coverage levels and how to determine a coverage level are described above, for example, with respect to step 604 of FIG. 6.

At step 706, the network node selects one of a plurality of configurations for sharing gaps between intra- and inter-frequency measurements. In some embodiments, network node determines to select the configuration for sharing gaps in response to determining that the radio frequency bandwidth of the wireless device is less than the radio frequency bandwidth of the serving cell by at least a pre-determined margin in step 702, in response to requesting the wireless device to measure on non-serving carriers in step 703, and/or in response to determining the coverage level of the wireless device with respect to a serving cell in step 704. The selection of a configuration for sharing gaps in step 704 is based on the determined coverage level and is generally analogous to the selection of a configuration for sharing gaps performed in step 604 of FIG. 6 except that, in step 704, the selection is performed by the network node (whereas in step 604 the selection is performed by the wireless device).

At step 708, the network node transmits the selected configuration for sharing gaps to the wireless device so that the wireless device can use the selected configuration to perform one or more measurements (e.g., step 608 of FIG. 6) and optionally send the result to the network node (e.g., step 610 of FIG. 6). At optional step 710, the network node receives the result of the one or more measurements from the wireless device, and at optional step 712 the network node uses the result of the one or more measurements for an operational task.

The following provides a non-limiting example of how certain aspects of the proposed solutions could be implemented within the framework of a specific communication standard. In particular, the following provides a non-limiting example of how the proposed solutions could be implemented within the framework of a 3GPP TSG Radio Access Network (RAN) standard. The changes described are merely intended to illustrate how certain aspects of the proposed solutions could be implemented in a particular standard. However, the proposed solutions could also be implemented in other suitable manners, both in the 3GPP Specification and in other specifications or standards.

For example, the embodiments for gap sharing based on a determined coverage level can be specified in a specification, such as 3GPP TS 36.133.

8.15.2 Requirements for UE Category M2 with CE Mode A

The UE category M2 applicability of the requirements in subclause 8.15.2 is defined in Section 3.6. The requirements in this section are applicable for UE category M2 configured with CE mode A. The requirements defined in clause 8.15.2 apply provided the following conditions are met:

UE is configured with measurement gap according to any of gap patterns defined in Table 8.1.2.1-1.

When UE is configured to perform inter-frequency measurements, the measurement performance for intra- and inter-frequency carrier(s) is determined by the value of X as in section 8.15.2.2 and section 8.15.2.3. The values of X are given by Table-X.

TABLE X

| Value of parameter X | |
|---|---|
| Network signaling ParameterName (to be determined by RAN2) | Value of X |
| '00' | 50 |
| '01' | Equal split |
| '10' | 60 |
| '11' | 70 |

When '01' is signaled, the value of X is calculated as $100/N_{freq}$, where $N_{freq}$ is the total number of carrier including intra- and inter-frequency carriers.

8.15.3 Requirements for UE Category M2 with CE Mode B

The UE category M2 applicability of the requirements in subclause 8.15.3 is defined in Section 3.6. The requirements in this section are applicable for UE category M2 configured with CE mode B. The requirements defined in clause 8.15.3 apply provided the following conditions are met:

UE is configured with measurement gap according to any of gap patterns defined in Table 8.1.2.1-1.

When UE is configured to perform inter-frequency measurements, the measurement performance for intra- and inter-frequency carrier(s) is determined by the value of X as in section 8.15.3.2 and section 8.15.3.3. The values of X are given by Table-X.

TABLE X

| Value of parameter X | |
|---|---|
| Network signaling ParameterName (to be determined by RAN2) | Value of X |
| '00' | 70 |
| '01' | 75 |
| '10' | 80 |
| '11' | 85 |

When '01' is signaled, the value of X is calculated as $100/N_{freq}$, where $N_{freq}$ is the total number of carrier including intra- and inter-frequency carriers.

Below another example of how the gap sharing based on the determined coverage level can be specified in a specification, 3GPP TS 36.133 which is slightly different from the proposal above, is shown:

8.15 Measurements for UE Category M2

8.15.1 Introduction

The UE category M2 applicability of the requirements in subclause 8.15 is defined in Section 3.6.

This clause contains requirements on the UE regarding measurement reporting in RRC_CONNECTED state. The requirements are specified for Evolved Universal Terrestrial Radio Access (E-UTRA) ultra frequency measurements. These measurements may be used by the E-UTRA network (E-UTRAN), e.g., for handover decisions. Control of measurement reporting is specified in TS 36.331.

When the UE is provided with IDC solution, the UE shall also perform RRM measurements and meet the corresponding requirements in clause 8

8.15.2 Measurement Gap Sharing Requirement

The UE category M2 applicability of the requirements in subclause 8.15 is defined in Section 3.6.

When UE is configured to perform inter-frequency measurements, the measurement performance for intra- and inter-frequency carrier(s) is determined by the value of X as in section 8.15.2.2 and section 8.15.2.3. The values of X are given by Table-X.

TABLE X

| Value of parameter X | |
|---|---|
| Network signaling ParameterName (to be determined by RAN2) | Value of X |
| '00' | 50 |
| '01' | Equal split |
| '10' | 70 |
| '11' | 80 |

When '01' is signaled, the value of X is calculated as $100/N_{freq}$, where $N_{freq}$ is the total number of carrier including intra- and inter-frequency carriers.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

The invention claimed is:

1. A wireless device comprising processing circuitry operable to:
   select, based at least in part on a determined coverage level, one of a plurality of configurations for sharing gaps between intra- and inter-frequency measurements; and
   perform one or more measurements according to the selected configuration for sharing gaps;
   wherein the determined coverage level corresponds to a low coverage level or a normal coverage level, a measurement period of the one or more measurements in the low coverage level is longer compared to a measurement period of the one or more measurements in the normal coverage level.

2. The wireless device of claim 1, the wireless further operable to determine the coverage level of the wireless device with respect to the serving cell.

3. The wireless device of claim 1, wherein the configuration for sharing gaps allocates a pre-defined percentage of gaps (X) for intra-frequency measurements and a remaining percentage of gaps (100−X) for inter-frequency measurements.

4. The wireless device of claim 1, wherein to select the configuration for sharing gaps, the wireless device is operable to:
select a first configuration for sharing gaps in response to determining that the coverage level corresponds to a first coverage level; and
select a second configuration for sharing gaps in response to determining that the coverage level corresponds to a second coverage level;
wherein the second coverage level is associated with worse coverage than the first coverage level and the second configuration for sharing gaps allocates a higher percentage of gaps for intra-frequency measurements than the first configuration for sharing gaps.

5. The wireless device of claim 1, wherein the one or more schemes associated with a first table that corresponds to a low coverage level allocate a higher percentage of gaps for intra-frequency measurements than the respective one or more schemes associated with a second table that corresponds to a normal coverage level, wherein the selected table is the first table or the second table.

6. The wireless device of claim 5, wherein:
the normal coverage level comprises a signal-to-noise ratio (SNR)≥−6 dB at the wireless device with respect to a signal received from the serving cell; and
the low coverage level comprises an SNR −15 dB≤SNR<−6 dB at the wireless device with respect to the signal received from the serving cell.

7. The wireless device of claim 5, wherein:
the normal coverage level comprises SCH Ês/Iot≥−6 dB and CRS Ês/Iot≥−6; and
the low coverage level comprises SCH Ês/Iot≥−15 dB and CRS Ês/Iot≥−15.

8. The wireless device of claim 1, wherein the coverage level is based at least in part on a signal quality and/or a signal strength of a signal that the wireless device receives from the serving cell.

9. The wireless device of claim 1, wherein the coverage level is based at least in part on a signal quality and/or a signal strength of a signal that the serving cell receives from the wireless device.

10. The wireless device of claim 1, wherein the coverage level is based at least in part on a number of repetitions used by the wireless device during a random access procedure.

11. The wireless device of claim 1, wherein the coverage level is determined from a plurality of coverage levels, the plurality of coverage levels comprising at least a first coverage level and a second coverage level.

12. The wireless device of claim 11, wherein the first coverage level corresponds to coverage enhanced mode A (CEModeA) and the second coverage level corresponds to coverage enhanced mode B (CEModeB).

13. The wireless device of claim 1, wherein to select the configuration for sharing gaps, the wireless device is operable to use the determined coverage level to select a portion of the selected table that is associated with the determined coverage level, wherein each portion of the selected table comprises one or more schemes that indicate how to share gaps between intra- and inter-frequency measurements.

14. The wireless device of claim 1, the wireless device further operable to use a result of the one or more measurements for an operational task.

15. A method for use in a wireless device, the method comprising:
selecting, based at least in part on a determined coverage level, one of a plurality of configurations for sharing gaps between intra- and inter-frequency measurements; and
performing one or more measurements according to the selected configuration for sharing gaps;
wherein the determined coverage level corresponds to a low coverage level or a normal coverage level, a measurement period of the one or more measurements in the low coverage level is longer compared to a measurement period of the one or more measurements in the normal coverage level.

16. The method of claim 15, further comprising determining the coverage level of the wireless device with respect to the serving cell.

17. The method of claim 15, wherein the configuration for sharing gaps allocates a pre-defined percentage of gaps (X) for intra-frequency measurements and a remaining percentage of gaps (100−X) for inter-frequency measurements.

18. The method of claim 15, wherein selecting the configuration for sharing gaps comprises:
selecting a first configuration for sharing gaps in response to determining that the coverage level corresponds to a first coverage level; and
selecting a second configuration for sharing gaps in response to determining that the coverage level corresponds to a second coverage level;
wherein the second coverage level is associated with worse coverage than the first coverage level and the second configuration for sharing gaps allocates a higher percentage of gaps for intra-frequency measurements than the first configuration for sharing gaps.

19. A non-transitory computer readable medium comprising logic that, when executed by processing circuitry of a wireless device, causes the wireless device to perform the method of claim 15.

20. A method for use in a network node, the method comprising:
selecting, based at least in part on a determined coverage level of a wireless device, one of a plurality of configurations for use by the wireless device for sharing gaps between intra- and inter-frequency measurements; and
transmitting the selected configuration for sharing gaps to the wireless device;
wherein the determined coverage level corresponds to a low coverage level or a normal coverage level, a measurement period of the one or more measurements in the low coverage level is longer compared to a measurement period of the one or more measurements in the normal coverage level.

21. The method of claim 20, further comprising determining the coverage level of the wireless device with respect to a serving cell.

22. The method of claim 20, wherein selecting the configuration for sharing gaps comprises:
selecting a first configuration for sharing gaps in response to determining that the coverage level corresponds to a first coverage level; and
selecting a second configuration for sharing gaps in response to determining that the coverage level corresponds to a second coverage level;
wherein the second coverage level is associated with worse coverage than the first coverage level and the second configuration for sharing gaps allocates a higher percentage of gaps for intra-frequency measurements than the first configuration for sharing gaps.

23. The method claim 22, wherein the first coverage level corresponds to coverage enhanced mode A (CEModeA) and the second coverage level corresponds to coverage enhanced mode B (CEModeB).

24. A network node comprising processing circuitry operable to:
- select, based at least in part on a determined coverage level of a wireless device, one of a plurality of configurations for use by the wireless device for sharing gaps between intra- and inter-frequency measurements; and
- transmit the selected configuration for sharing gaps to the wireless device;
- wherein the determined coverage level corresponds to a low coverage level or a normal coverage level, a measurement period of the one or more measurements in the low coverage level is longer compared to a measurement period of the one or more measurements in the normal coverage level.

25. A non-transitory computer readable medium comprising logic that, when executed by processing circuitry of a network node, causes the network node to perform the method of claim 20.

26. The wireless device of claim 1, wherein to select the configuration for sharing gaps, the wireless device is operable to use the determined coverage level to select one of a plurality of tables, each table comprising one or more schemes that indicate how to share gaps between intra- and inter-frequency measurements.

* * * * *